(12) United States Patent
Torres et al.

(10) Patent No.: US 12,709,192 B2
(45) Date of Patent: Aug. 18, 2026

(54) ALTERNATING CURRENT ZERO TORQUE RESISTANCE HEATING

(71) Applicant: GM Global Technology Operations LLC, Detroit, MI (US)

(72) Inventors: Renato Amorim Torres, Pontiac, MI (US); Lei Hao, Troy, MI (US); Suresh Gopalakrishnan, Troy, MI (US); Chandra S. Namuduri, Troy, MI (US); Dongxu Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 759 days.

(21) Appl. No.: 18/311,494

(22) Filed: May 3, 2023

(65) Prior Publication Data

US 2024/0367552 A1 Nov. 7, 2024

(51) Int. Cl.

| | |
|---|---|
| ***H01M 10/61*** | (2014.01) |
| ***B60L 58/27*** | (2019.01) |
| ***H01M 10/615*** | (2014.01) |
| ***H01M 10/625*** | (2014.01) |
| ***H01M 10/6571*** | (2014.01) |
| ***H02P 21/18*** | (2016.01) |
| ***H02P 21/22*** | (2016.01) |
| ***H02P 27/12*** | (2006.01) |
| ***H05B 1/02*** | (2006.01) |

(52) U.S. Cl.

CPC .......... *B60L 58/27* (2019.02); *H01M 10/615* (2015.04); *H01M 10/625* (2015.04); *H01M 10/6571* (2015.04); *H02P 21/18* (2016.02); *H02P 21/22* (2016.02); *H02P 27/12* (2013.01); *H05B 1/0236* (2013.01); *H01M 2220/20* (2013.01)

(58) Field of Classification Search

CPC ... B60L 58/27; H01M 10/615; H01M 10/625; H01M 10/6571; H01M 2220/20; H02P 21/18; H02P 21/22; H02P 27/12; H05B 1/0236

See application file for complete search history.

(56) References Cited

U.S. PATENT DOCUMENTS

| | | | | |
|---|---|---|---|---|
| 8,606,447 | B2 * | 12/2013 | Namuduri | F02N 11/006 701/22 |
| 10,727,552 | B2 * | 7/2020 | March | H01M 10/6554 |
| 10,854,933 | B2 * | 12/2020 | Hao | B60L 3/0046 |

* cited by examiner

*Primary Examiner* — Michael L Sehn

(74) *Attorney, Agent, or Firm* — CANTOR COLBURN LLP

(57) ABSTRACT

A method and apparatus for heating a battery pack in an electrified vehicle provides a zero d-axis current command and a zero q-axis current command to a field-oriented controller for an alternating current (AC) motor coupled to the battery pack through a power inverter module controlled by the field-oriented controller. An AC signal is injected onto the d-axis of the field-oriented controller resulting in an AC current through the battery pack effecting AC resistance heating.

20 Claims, 3 Drawing Sheets

ALTERNATING CURRENT ZERO TORQUE RESISTANCE HEATING

INTRODUCTION

The subject disclosure relates to heating of high voltage batteries such as lithium chemistry propulsion batteries found in electric vehicles.

Lithium batteries may be preferred in many applications, including propulsion systems, due to their high energy density. Lithium battery discharge performance at cold temperatures is generally much better than lead-acid or nickel metal hydride batteries, but discharge performance at cold temperatures is still significantly below battery performance capability at higher temperatures. Batteries may also be more prone to damage with low temperature aggressive discharge. Low temperature charging is limited by anode plating which may cause performance degradation. Thus, until a lithium battery reaches a certain temperature, charging a lithium battery remains limited and discharge performance is reduced. This is especially true at sub-zero temperatures. Battery performance may be improved and battery life may be extended when charging and discharging by maintaining battery temperature within certain ranges. In addition to performance and longevity benefits of maintaining certain temperature ranges during battery charging and discharging, charge time may be reduced when performed within a certain temperature range.

Various methods of pre-heating a Lithium battery may include discharge current self-heating using internal resistance, heating/cooling plates, and positive temperature coefficient (PTC) devices among others incorporated into the battery structure. Various anticipatory charge schemes may include scheduled, conditional (e.g., cold soak time) or predictive (e.g., probabilistic model) preheating of a battery pack in advance of a charge event. Preheating of the battery pack may take place during times when the vehicle is parked, for example prior to a drive cycle of the vehicle or prior to a charge event.

SUMMARY

In one exemplary embodiment, a method for heating a battery pack in an electrified vehicle may include providing a zero d-axis current command and a zero q-axis current command to a field-oriented controller for an alternating current (AC) motor coupled to the battery pack through a power inverter module controlled by the field-oriented controller, and injecting an AC signal onto the d-axis of the field-oriented controller.

In addition to one or more of the features described herein, injecting the AC signal onto the d-axis of the field-oriented controller may include injecting the AC signal onto the zero d-axis current command.

In addition to one or more of the features described herein, injecting the AC signal onto the d-axis of the field-oriented controller may include injecting the AC signal onto a d-axis voltage command.

In addition to one or more of the features described herein, the method may derive an estimated rotor angular position from a q-axis voltage command from the field-oriented controller that is demodulated based upon the AC signal.

In addition to one or more of the features described herein, the AC signal may include an amplitude of low torque convergence of the estimated rotor angular position to a static rotor position.

In addition to one or more of the features described herein, the method may include deriving an estimated rotor angular position error from a q-axis voltage command from the field-oriented controller based upon the following relationship:

$$\tilde{V}_{qh}^{\hat{e}} = \tilde{I}_{dh}^{\hat{e}}\left(-Z_{diff}\sin 2\hat{\theta}_{err}\right)$$

where $\hat{\theta}_{err}$ is the estimated rotor angular position error, $Z_{diff}$ is a difference between a stator impedance on the d-axis and a stator impedance on the q-axis, $$\tilde{V}_{qh}^{\hat{e}}$$

is a q-axis voltage command, and $$\tilde{I}_{dh}^{\hat{e}}$$

is a d-axis current command subsequent to the AC signal injection.

In addition to one or more of the features described herein, the method may further include controlling a rotor toward a predetermined angular position of maximum battery pack heating efficiency.

In addition to one or more of the features described herein, the field-oriented controller may include a resonant controller module.

In addition to one or more of the features described herein, injecting the AC signal onto the d-axis of the field-oriented controller may include controlling an amplitude, a shape and a frequency of the AC signal.

In another exemplary embodiment, an apparatus for heating a battery pack in an electrified vehicle may include an alternating current (AC) motor coupled to the battery pack through a power inverter module, and a field-oriented controller controlling the AC motor based upon a zero d-axis current command and a zero q-axis current command and an AC signal injected onto the d-axis of the field-oriented controller.

In addition to one or more of the features described herein, the AC signal injected onto the d-axis of the field-oriented controller may include the AC signal injected onto the zero d-axis current command.

In addition to one or more of the features described herein, the AC signal injected onto the d-axis of the field-oriented controller may include the AC signal injected onto a d-axis voltage command.

In addition to one or more of the features described herein, the apparatus may further include an angular position estimation module deriving an estimated rotor angular position from a q-axis voltage command from the field-oriented controller that is demodulated based upon the AC signal.

In addition to one or more of the features described herein, the AC signal may include an amplitude of low torque convergence of the estimated rotor angular position to a static rotor position.

In addition to one or more of the features described herein, the apparatus may further include an angular position estimation module deriving an estimated rotor angular position error from a q-axis voltage command from the field-oriented controller based upon the following relationship:

$$\tilde{V}_{qh}^{\hat{e}} = \tilde{I}_{dh}^{\hat{e}}\left(-Z_{diff}\sin 2\hat{\theta}_{err}\right)$$

where $\hat{\theta}_{err}$ is the estimated rotor angular position error, $Z_{diff}$ is a difference between a stator impedance on the d-axis and a stator impedance on the q-axis, $$\tilde{V}_{qh}^{\hat{e}}$$

is a q-axis voltage command, and $$\tilde{I}_{dh}^{\hat{e}}$$

is a d-axis current command subsequent to the AC signal injection.

In addition to one or more of the features described herein, the field-oriented controller controls a rotor toward a predetermined angular position of maximum battery pack heating efficiency.

In addition to one or more of the features described herein, the field-oriented controller may include a resonant controller module.

In addition to one or more of the features described herein, the AC signal injected onto the d-axis of the field-oriented controller may include an amplitude, a shape and a frequency of the AC signal.

In yet another exemplary embodiment, an electrified vehicle may include a rechargeable energy storage system including a battery pack, an electric drive unit including a three-phase alternating current motor having a stator including three phase windings and a rotor, a traction power inverter module coupling the battery pack via a direct current (DC) link to the three-phase alternating current motor, a motor controller, and a gearbox mechanically coupling a rotor shaft of the rotor to at least one mechanical output, at least one wheel mechanically coupled to the at least one mechanical output of the gearbox, and the motor controller including a field-oriented controller controlling the three-phase alternating current motor based upon a zero d-axis current command and a zero q-axis current command, the motor controller further including an alternating current signal injected onto the zero d-axis current command effective to produce a perturbation on the DC link effecting an alternating current through the battery pack.

In addition to one or more of the features described herein, the field-oriented controller may include an angular position estimation module deriving an estimated rotor angular position from a q-axis voltage command from the field-oriented controller that is demodulated based upon the alternating current signal, and a resonant controller module.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference labels indicate like or corresponding parts and features. Description of parts and features in one drawing is understood to apply to parts and features in other drawings sharing the same reference labels to the extent such parts and features are not otherwise distinguishable through drawing examination by one having ordinary skill in the art or distinguished by additional written description herein.

As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle networks (e.g. Controller Area Network (CAN), Local Interconnect Network (LIN) and in-plant and service-related networks. Control module functions as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

Figure 1:
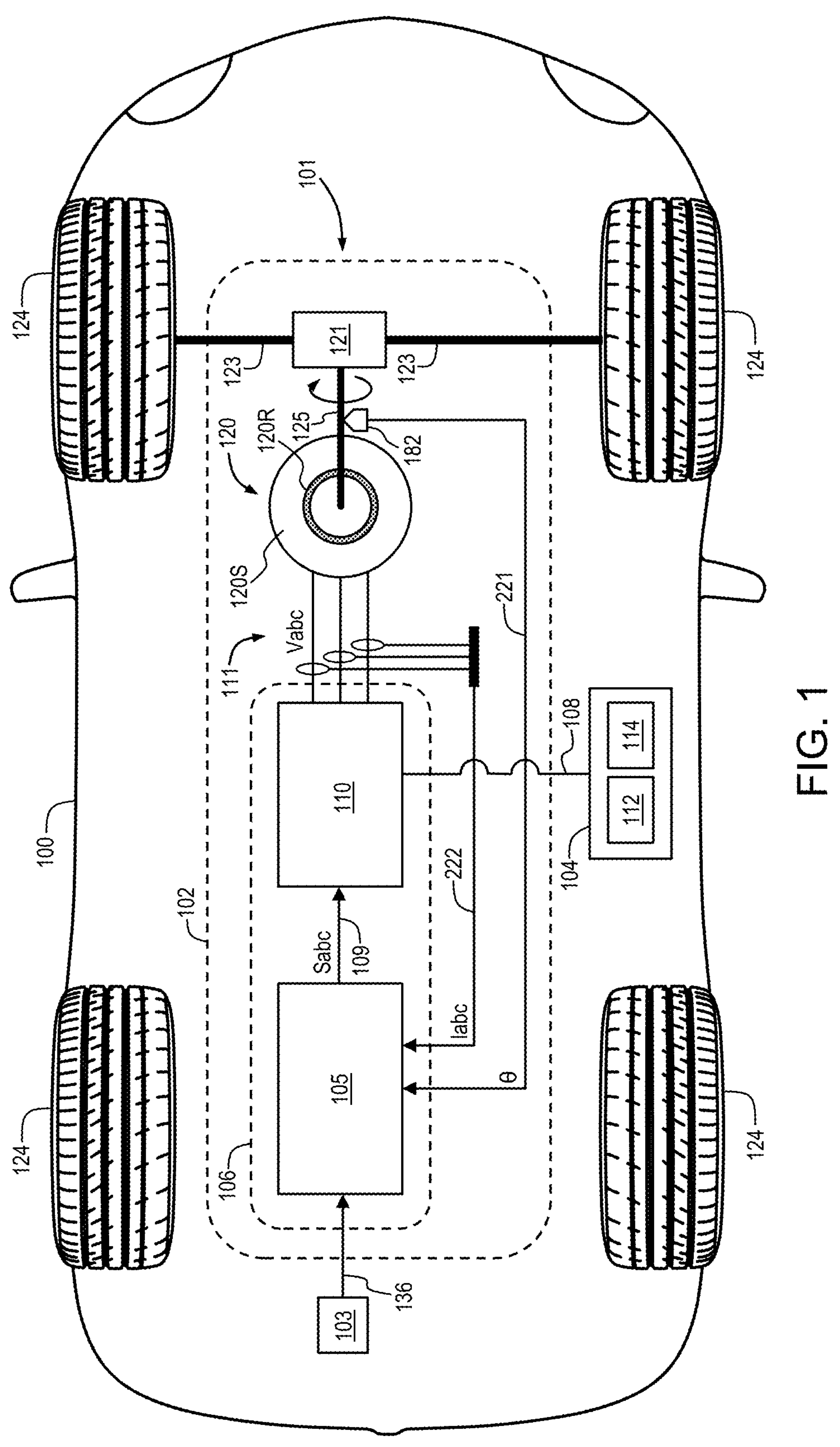
FIG. 1 schematically illustrates an electric propulsion system on a vehicle, in accordance with the present disclosure.

FIG. 1 schematically illustrates an embodiment of an electric propulsion system 101 on a vehicle 100. Vehicle and vehicular are understood to refer to any means of transportation including non-limiting examples of motorcycles, cars, trucks, buses, excavation, earth moving, construction and farming equipment, railed vehicles like trains and trams, watercraft like ships and boats, and aircraft. The electric propulsion system 101 may include various control components, electrical systems and electro-mechanical systems including, for example, a rechargeable energy storage system (RESS) 104 and an electric drive unit (EDU) 102. The electric propulsion system 101 may be employed on a powertrain system to generate propulsion torque as a replacement for, or in conjunction with, an internal combustion engine in various electric vehicle (EV) applications and hybrid electric vehicle (HEV) applications, respectively.

The EDU 102 may be of varying complexity, componentry and integration. An exemplary highly integrated EDU 102 may include, for example, a rotary electric machine such as an alternating current (AC) motor (motor) 120 and a traction power inverter module (TPIM) 106 including a motor controller 105 and a power inverter 110. The motor 120 may include a stator 120S and a rotor 120R coupled to a rotor shaft 125 and a position sensor 182, for example a variable reluctance resolver or an encoder. The position sensor 182 may signally connect directly to the motor controller 105 and is employed to monitor angular position (θ) of the rotor of the motor 120. The angular position (θ) of the rotor of the motor 120 is employed by the motor controller 105 to control operation of the power inverter 110 that controls torque production and other functions of the motor 120.

The rotor shaft 125 may transfer torque between the motor 120 and driveline components, some of which may be integrated within the EDU 102, for example in a gearbox 121 including reduction and differential gear sets and one or more mechanical outputs (e.g., axle, half-shaft, propshaft or power take off). The gearbox 121 may simply include reduction gearing and a prop shaft output for coupling to a differential gear set. One or more axles 123 may couple to the gearbox 121 directly or through final drive or differential gear sets if separate therefrom. Axle(s) 123 may couple to one or more vehicle wheel(s) 124 for transferring tractive force between a wheel and pavement. One having ordinary skill in the art will recognize alternative arrangements for driveline components. Propulsion torque requests or commands 136 (Tcmd) may be provided by a vehicle controller 103 to the motor controller 105 as a discrete input over a network bus, such as a CAN bus.

The RESS 104 may, in one embodiment, include one or more electro-chemical battery packs 112, for example high capacity, high voltage (HV) rechargeable lithium ion battery packs for providing power to the vehicle via a HV direct current (DC) bus 108. The HV DC bus 108 may also be referred to herein as DC link. The RESS 104 may also include a battery manager module 114. The RESS 104 may include one or more battery packs 112 constructed from a plurality of battery pack modules allowing for flexibility in configurations and adaptation to application requirements. Battery packs may include a plurality of battery pack modules constructed from a plurality of cells allowing for flexibility in configurations and adaptation to application requirements. Battery pack modules may include a plurality of cells allowing for flexibility in configurations and adaptation to application requirements. For example, in vehicular uses, the RESS 104 may be modular to the extent that the number of battery pack modules may be varied to accommodate a desired energy density or range objective of a particular vehicle platform, intended use, or cost target. Battery packs and battery pack modules may be variously and selectively configured in accordance with desired propulsion architecture and charging and discharging functions. It is understood that the RESS 104 may be reconfigurable at any level of integration including battery pack, battery module and cell. Reference herein to RESS or battery pack may be made interchangeably.

The motor 120 may be a multi-phase AC motor receiving multi-phase AC power over a multi-phase power bus (AC bus) 111 which is coupled to the power inverter 110. In one embodiment, the motor 120 is a three-phase motor and the power inverter 110 is a three-phase inverter. The power inverter 110 may include a plurality of solid-state switches in a solid-state switching section. The power inverter 110 couples to DC power over the HV DC bus 108 (i.e., DC link) (DC input voltage (Vdc)) from the RESS 104, for example at 400 or 800 volts. The motor controller 105 is coupled to the power inverter 110 for control thereof. The power inverter 110 electrically connects to stator phase windings of a three-phase stator winding of the motor 120 via the AC bus 111, with electric current (Iabc) 222 monitored on two or three phases thereof. The AC bus 111 provides conductive coupling of the multi-phase outputs of the power inverter 110 to phase terminals of the stator windings. The AC bus 111 may include AC bus features of the TPIM 106, AC bus features of the motor 120 and conductors connecting the AC bus features of the TPIM 106 and the AC bus features of the motor 120. As used herein, AC bus 111 includes all high voltage/high current phase conductors between the switching section of the power inverter 110 and the motor 120 including, for example, bus bars, cables, rods etc. The power inverter 110 may be configured with suitable control circuits including paired power transistors (e.g., IGBTs) for transforming high-voltage DC voltage on the HV DC bus 108 to high-voltage three-phase AC voltage (Vabc) on the AC bus 111 and transforming high-voltage three-phase AC voltage (Vabc) on the AC bus 111 to high-voltage DC voltage on the HV DC bus 108. The power inverter 110 may employ any suitable pulse width modulation (PWM) control, for example sinusoidal pulse width modulation (SPWM) or space vector pulse width modulation (SVPWM), as well as adaptive (APWM) and variable frequency (VFPWM) PWM variants and others to generate switching vector signals (Sabc) 109 to convert stored DC electric power originating in the battery pack 112 of the RESS 104 to AC electric power to drive the motor 120 to generate torque. Similarly, the power inverter 110 may convert mechanical power transferred to the motor 120 to DC electric power to generate electric energy that is storable in the battery pack 112 of the RESS 104, including as part of a regenerative braking control strategy. The power inverter 110 may be configured to receive the switching vector signals (Sabc) 109 from motor controller 105 and control inverter states to provide the motor drive and regeneration functionality. Switching vector signals (Sabc) 109 may also be referred to herein as conduction commands.

Control of the power inverter 110 may include high frequency switching of the solid-state switches in accordance with the PWM control and slew rate control if equipped. A number of design and application considerations and limitations determine inverter switching frequency and PWM control. Inverter controls for AC motor applications may include fixed switching frequencies, for example switching frequencies around 10-30 KHz and PWM controls that minimize switching losses of the IGBTs or other power switches of the power inverter 110. Higher switching frequencies may be achievable with emerging solid-state switching technologies such as silicon carbide (SiC) MOSFETs, gallium nitride (GaN) transistors, diamond MOSFETs, carbon nano-tube transistors, and graphene-based transistors.

The disclosed improvements relate to self-heating of the battery pack by generating an AC current through the battery pack from energy stored within the battery pack. Such technique may generally be referred to as AC resistance heating and works by passing the AC current through the battery pack's internal resistance (i.e., through each cell's internal resistance), which causes the battery pack to heat up due to the heat generated by the internal resistance. In embodiments described herein, existing reactive loads of the motor in a propulsion system of a vehicle are utilized in efficiently self-heating of the battery pack. More particularly, the phase windings of the motor may be utilized to store electrical energy from the battery pack and return the energy to the battery pack thereby effecting internal ohmic heating of the battery pack. In embodiments described herein a perturbation on the DC link which couples the battery pack to the power inverter effects an AC current through the battery pack. A perturbation in the DC link may be caused by generating unbalanced phase voltages in the phase windings. AC resistance heating may be used to control the battery pack temperature to a predetermined range for a battery discharge or recharge event. In accordance with the present disclosure, it is generally desirable to thermally precondition the battery pack in order that the vehicle is made ready to drive or recharge with the battery pack within an advantageous temperature range.

Advantageously, AC resistance heating may be applied when the battery pack is being charged, for example during DC fast charging in a constant current mode. Advantageously, AC resistance heating may be applied when one or more high voltage loads (e.g., AC compressor control module, accessory power module, high voltage heater, etc.) are operational on the HV DC bus coupled to the battery terminals.

Figure 2:
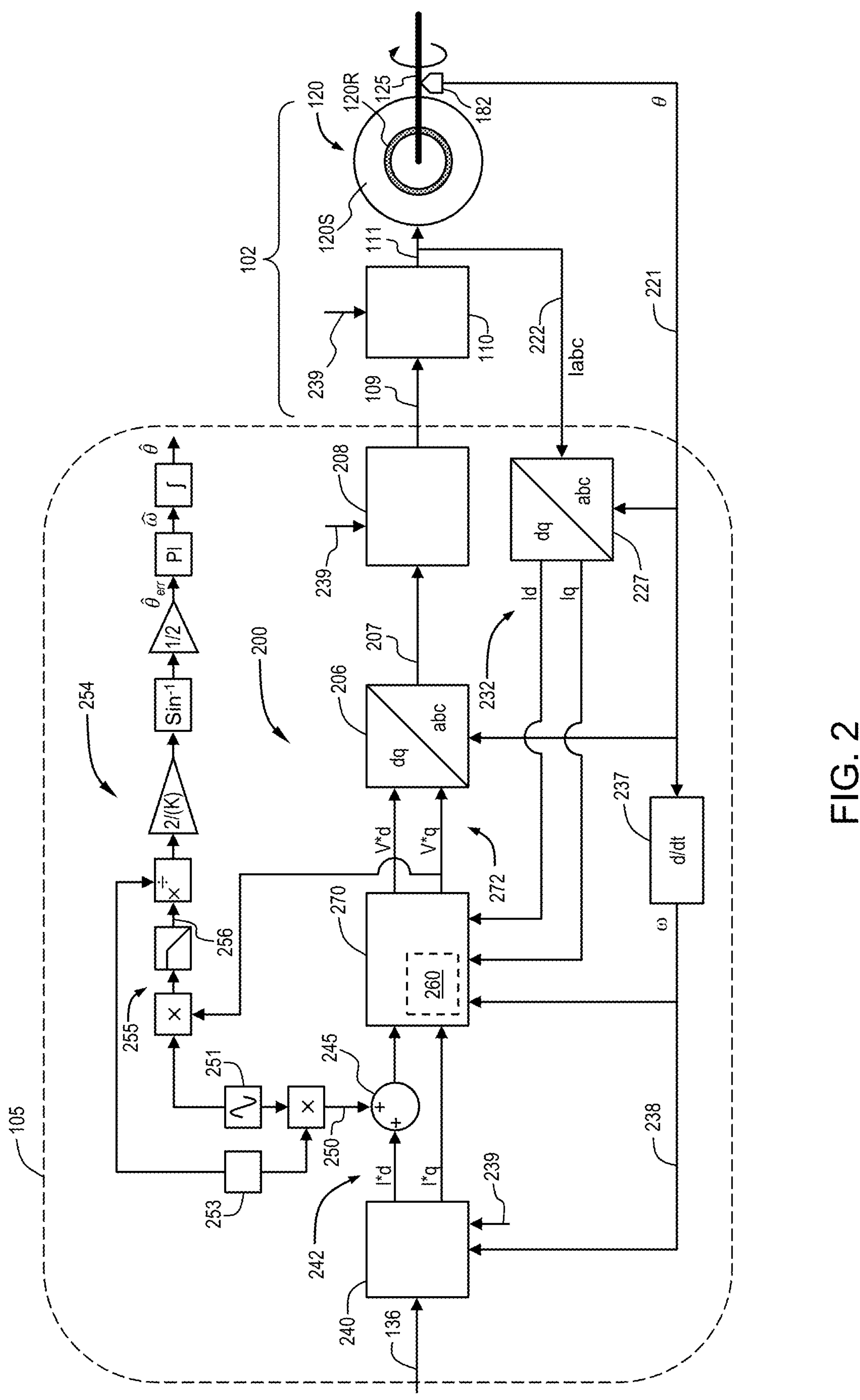
FIG. 2 is a block diagram of a motor controller and electric drive unit employing a field-oriented controller, in accordance with the present disclosure.

FIG. 2 is a block diagram of a motor controller 105 and EDU 102 employing an exemplary field-oriented controller (FOC) 200 in accordance with one embodiment. The EDU 102 may include an AC motor 120 and inverter module 110. Using a FOC control scheme, the FOC 200 controls the AC motor 120 via the inverter module 110 coupled to the three phase (abc) windings of the AC motor 120 so that the AC motor 120 can efficiently use a DC input voltage (Vdc) (i.e., HV DC bus voltage) provided to the inverter module 110 by adjusting current commands to the FOC controller 200. FOC 200 may employ direct-quadrature (dq) transformations (abc-dq) to simplify analysis and control of the multi-phase circuits operation of the AC motor 120. This permits reducing three AC quantities to two direct current (DC) quantities for ease of calculations and associated control in the dq reference frame. A stator motor current space vector can be defined in the dq reference frame with orthogonal components along the d-axis and the q-axis such that a field flux linkage is aligned along the d-axis and a torque component is aligned along the q-axis. After execution of calculations, an inverse transformation (dq-abc) occurs to determine control commands for operating the motor that can be executed in the inverter module 110.

In the following description of one particular non-limiting implementation, the three-phase AC motor 120 may be a three-phase, interior permanent magnet AC machine. However, it should be appreciated that the illustrated embodiment is only one non-limiting example of the types of three-phase AC machines that the disclosed embodiments may be applied to. Further, it will also be appreciated that the disclosed embodiments are not limited to a three-phase system, and in other embodiments, the AC motor 120 can have other numbers of phases. Further, the disclosed embodiments may be applied to any type of multi-phase AC machine that includes fewer or more phases.

The AC motor 120 is coupled to the inverter module 110 via three inverter poles and generates mechanical power as the product of torque and speed based on three-phase currents (Iabc) received from the inverter module 110. In the present embodiment, the rotor angular position (θ) 221 or "shaft position" is measured using the position sensor 182. A derivative function 237, or a virtual software observer of the rotor angular position (θ) 221 with respect to time may be used to generate the rotor angular velocity (ω) 238 of the AC motor 120.

The FOC 200 includes a command generation module 240, a current regulator module 270 (e.g., P-I controller), a synchronous (dq) reference frame to stationary three-phase (abc) reference frame (dq-to-abc reference frame) transformation module 206, a pulse width modulation (PWM) generation module 208, and a stationary three-phase (abc) reference frame to synchronous (dq) reference frame (abc-to-dq reference frame) transformation module 227.

The command generation module 240 receives a torque command signal (Tcmd) 136, the rotor angular velocity (ω) 238 of the shaft that is generated based on the derivative of the rotor angular position (θ) 221, and the DC input voltage (Vdc) 239 as inputs, along with other system parameters depending upon implementation. The command generation module 240 uses these inputs to generate synchronous reference frame d-axis and q-axis current commands (I*d and I*q, respectively) 242 that will cause the AC motor 120 to generate the commanded torque (Tcmd) at the rotor angular velocity (ω) 238. Thus, in accordance with one embodiment, the command generation module 240 may use the inputs to map the torque command signal (Tcmd) 136 to the synchronous reference frame d-axis and q-axis current commands (I*d and I*q, respectively) 242 to effect desired torque objectives.

The abc-to-dq transformation module 227 receives measured three-phase stationary reference frame stator currents (Iabc) 222 that are fed back from the AC motor 120. The abc-to-dq transformation module 227 uses these three-phase stationary reference frame stator currents (Iabc) 222 to perform an abc-to-dq reference frame transformation to transform the three-phase stationary reference frame stator currents (Iabc) 222 into synchronous reference frame feedback current signals (Id and Iq) 232. The process of stationary-to-synchronous conversion is well-known in the art.

The current regulator module 270 receives the synchronous reference frame current commands (I*d and I*q) 242 and the synchronous reference frame feedback current signals (Id and Iq) 232 to generate synchronous reference frame voltage commands (V*d and V*q) 272. The synchronous reference frame voltage commands (V*d and V*q) 272 are DC commands that have a constant value as a function of time for steady state operation. Because the current commands are DC signals in the synchronous reference frame they are easier to regulate in comparison to AC stationary reference frame current commands. The process of current to voltage conversion by current regulator module 270 may be implemented as a proportional-integral (PI) controller, which is known in the art.

The dq-to-abc reference frame transformation module 206 receives the synchronous reference frame voltage commands (V*d and V*q) 272 and rotor angular position (θ) 221. Based on these signals, the transformation module 206 generates stationary reference frame voltage commands (Vabc-cmd) 207 (also referred to as "phase voltage signals" or "phase voltage commands") that are sent to the PWM generation module 208. The dq-to-abc transformation may be performed using any known transformation techniques.

The inverter module 110 is coupled to the PWM generation module 208. The PWM generation module 208 is used for the control of pulse width modulation of the phase voltage command signals (Vabc-cmd) 207. Switching vector signals (Sabc) 109 are generated based on duty cycle waveforms that are internally generated by the PWM generation module 208 to have a particular duty cycle during each PWM period. The PWM generation module 208 modifies the phase voltage command signals (Vabc-cmd) 207 based on the duty cycle waveforms and the DC input voltage (Vdc) 239 to generate the switching vector signals (Sabc) 109, which it provides to the inverter module 110. The particular modulation algorithm implemented in the PWM generation module 208 may be any known modulation algorithm including continuous PWM techniques (e.g., Space Vector Pulse Width Modulation (SVPWM)) or discontinuous PWM techniques (e.g., DPWM) techniques, as well as adaptive (APWM) and variable frequency (VFPWM) PWM variants, to create AC waveforms that drive the AC motor 120 at varying angular velocities based on the DC input voltage (Vdc) 239. It is generally appreciated that discontinuous PWM has lower switching losses and hence less heat generation than continuous PWM. Moreover, the switching frequency implemented in the PWM generation module 208 may be fixed or variable in accordance with various control objectives and efficiency tradeoffs.

The switching vector signals (Sabc) 109 control the switching states of switches in the inverter module 110 to generate the respective phase voltages at each phase winding of the AC motor 120. The switching vector signals (Sabc) 109 are PWM waveforms that have a particular duty cycle during each PWM period that is determined by the duty cycle waveforms that are internally generated at the PWM generation module 208. The AC motor 120 receives the three-phase voltage signals generated by the inverter module 110 and generates a machine output at the commanded torque (Tcmd) 136.

During a propulsion mode of operation, the three phase voltages are generally controlled with 120 degrees phase separation at equivalent voltage levels, thus producing balanced three-phase AC voltage and corresponding currents resulting in a rotating magnetic field generating torque upon the rotor. However, during an AC resistance heating mode of operation, rotor torque generation is generally not desirable with certain exceptions as described herein. Thus, it is understood that the three phase voltages and currents may be controlled in phase separation and voltage levels to achieve near zero rotor torque and a perturbation in the DC link resulting in an AC current through the battery pack. Essentially, one phase voltage may be 180 degrees out of phase with the remaining two phase voltages and the voltage levels of the three phase voltages controlled to achieve near zero rotor torque based on the rotor position while controllably establishing a perturbation upon the DC link causing AC current through the battery pack having magnitude and frequency related to the amplitude and frequency of the phase voltages. Thus, in the stationary reference frame related to three phase voltages and currents, phase and voltage manipulations may achieve zero rotor torque and controlled AC current through the battery pack. During a propulsion mode of operation when the rotor is turning, it is recognized that the q-axis current components produce torque upon the rotor whereas the d-axis current components primarily do not with the exception of reluctance torque. Advantageously, in accordance with embodiments, production of d-axis current components and suppression of q-axis current components within the synchronous reference frame while the rotor is static may provide for simplified near zero rotor torque production simultaneously with AC current production through the battery pack during an AC resistance heating mode of operation.

In an embodiment as illustrated in FIG. 2, an exemplary implementation of AC resistive heating through a robust, simplified control advantageously adapting FOC 200 outside of a propulsion mode is shown. The torque command signal (Tcmd) 136 may be established at a null value which results in the command generation module 240 generate synchronous reference frame d-axis and q-axis current commands (I*d and I*q, respectively) 242 of zero. Summing node 245 is provided with the d-axis current command I*d and an AC signal 250 which results in a non-zero, AC signal being injected to the current regulator module 270 on the d-axis current command I*d. The q-axis current command remains null and thus it is appreciated that the FOC 200 controls stator non-zero stator currents on the d-axis and zero stator currents along the q-axis. At the stator windings, one phase voltage may be 180 degrees out of phase with the remaining two phase voltages. Thus, the AC signal being injected to the current regulator module 270 on the d-axis controllably establishes a perturbation upon the DC link causing AC current through the battery pack having magnitude and frequency related to the AC signal being injected. The AC signal 250 may be provided in accordance with a frequency module 251 and amplitude module 253. The frequency module establishes the frequency and shape of the AC signal 250, for example 100 Hz pure sinusoidal. Other shapes may include sine+harmonics, triangular, or trapezoidal, for example, so long as the shape is purely periodic. Also, the frequency or shape may be a design parameter based upon battery pack factors including battery chemistry and age, and may be adaptively manipulated during an AC resistance heating cycle or over the lifetime of a battery pack as desired. The amplitude module 253 determines the amplitude of the AC signal 250 and hence the magnitude of the phase voltages and the AC resistance heating current magnitude. Control of the amplitude, shape and frequency of the AC signal 250 advantageously corresponds to control of the rate of battery pack heating which may desirably be limited or accelerated in accordance with battery pack factors including battery chemistry and age, battery pack construction layout, and control objectives and targets. Amplitude, shape and frequency of the AC signal 250 may all be controlled independently one from the next.

In an embodiment, the AC signal 250 may alternatively be injected to the current regulator module 270 on the d-axis voltage command V*d.

In an embodiment, the tracking performance of the current regulator module 270 may be made more robust in view of the relatively high frequency and repetitive nature of the AC signal 250 as compared to typical DC propulsion torque related current commands. An exemplary implementation may incorporate a resonant controller module 260 with the more conventional P-I controller of the current regulator module 270. The inclusion of a resonant controller module 260 ensures that the current regulator module 270 tracks the high frequency component (i.e., AC signal 250) being injected to the current regulator module 270 on the d-axis current command I*d.

Rotor stasis, for example during an AC resistance heating mode of operation, may provide opportunity for sensorless determination of rotor angular position. Sensorless determination of rotor angular position may also be referred to as estimated rotor angular position. Such estimated rotor angular position may be used in place of or in conjunction with the sensed rotor angular position from the position sensor 182 including, for example, opportunistically during rotor stasis to recalibrate the position sensor 182 to account for resolver drift or offset or other temporally based sensor or processing anomalies. Moreover, either or both of the estimated or sensed rotor angular position may be used in AC resistive heating related rotor positioning controls to effect zero torque and heat efficiency objectives as described further herein.

In an embodiment corresponding to estimating rotor angular position, the motor may be modeled in accordance with the following equation which is represented in the synchronous reference frame as indicated by the superscripted e representing true rotor angular position.

$$\begin{bmatrix} v_d^e \\ v_q^e \end{bmatrix} = \begin{bmatrix} R_s + L_d p & -\omega_r L_q \\ \omega_r L_d & R_s + L_q p \end{bmatrix} \begin{bmatrix} i_{s,d}^e \\ i_{s,q}^e \end{bmatrix} + \begin{bmatrix} 0 \\ \omega_r \lambda_{PM} \end{bmatrix} \quad [1]$$

wherein $v_d^e$ is the d-axis stator voltage, $v_q^e$ is the q-axis stator voltage, $R_s$ is the stator per-phase resistance, $L_d$ is the d-axis stator inductance, $L_q$ is the q-axis stator inductance, p is the differential operator d/dt, $R_s+L_dp$ is the d-axis stator impedance, $R_s+L_qp$ is the q-axis stator impedance, $\omega_r$ is the rotor electrical speed (angular velocity), $\omega_rL_q$ is the q-axis cross-coupling stator impedance, $\omega_rL_d$ is the d-axis cross-coupling stator impedance, $i_{s,d}^e$ is the d-axis stator current, $i_{s,q}^e$ is the q-axis stator current, $\lambda_{PM}$ is the stator flux linkage from the rotor permanent magnets, and $\omega_r\lambda_{PM}$ is the stator back emf.

In an embodiment characterized by a static rotor, such as described herein for AC resistance heating of the battery pack, since the rotor speed $\omega_r$ is zero the rotor speed dependent terms reduce to zero. Thus, the d-axis voltage and the q-axis voltage may be simply represented by the respective stator impedances multiplied by the respective d-axis or q-axis stator currents and simplified as follows:

$$\begin{bmatrix} \tilde{V}_{dh}^e \\ \tilde{V}_{qh}^e \end{bmatrix} = \begin{bmatrix} Z_{dh} & 0 \\ 0 & Z_{qh} \end{bmatrix} \begin{bmatrix} \tilde{I}_{dh}^e \\ \tilde{I}_{qh}^e \end{bmatrix} \quad [2]$$

where $Z_{dh}$ is the d-axis stator impedance, and $Z_{qh}$ is the q-axis stator impedance.

It is noted that the d- and q-axis voltages and currents are designated with an over-tilde (~) signifying they are AC quantities and subscripted with (h) signifying high frequency components (e.g., 100 Hz or greater), for example during an AC resistance heating mode of operation. Equation [2] herein may represent ideal rotor stasis conditions wherein the d-axis current is aligned with the rotor angular position (i.e., rotor axis). With such alignment, there is also no static cross-coupling between the d- and q-axis stator currents. However, with deviation between the rotor axis and the d-axis, a cross-coupling phenomenon may occur due to the rotor magnetic misalignment related to the angular deviation which may be represented in the equation [3] herein, from which estimated rotor angular position may be derived. Thus, equation [3] is represented in the estimated synchronous reference frame as indicated by the superscripted "e overhat" (ê) based upon sensorless estimated rotor angular position error. The over-hat is also used to distinguish estimated rotor angular position ($\hat{\theta}$).

$$\begin{bmatrix} \tilde{V}_{dh}^{\hat{e}} \\ \tilde{V}_{qh}^{\hat{e}} \end{bmatrix} = \begin{bmatrix} Z_{avg} - Z_{diff}\cos(2\hat{\theta}_{err}) & -Z_{diff}\sin(2\hat{\theta}_{err}) \\ -Z_{diff}\sin(2\hat{\theta}_{err}) & Z_{avg} + Z_{diff}\cos(2\hat{\theta}_{err}) \end{bmatrix} \begin{bmatrix} \tilde{I}_{dh}^{\hat{e}} \\ \tilde{I}_{qh}^{\hat{e}} \end{bmatrix} \quad [3]$$

where $\hat{\theta}_{err}$ is the estimated rotor angular position error (deviation between the rotor axis and the d-axis), $Z_{avg}$ is the average stator impedance, $Z_{diff}$ is the difference between the stator impedance on the d-axis and the stator impedance on the q-axis, and $Z_{diff}\cos(2\hat{\theta}_{err})$ and $Z_{diff}\sin(2\hat{\theta}_{err})$ are the cross-coupling impedances due to the angular position error.

Assuming injection exclusively of a d-axis current $\tilde{I}_{dh}^{\hat{e}}$ only (i.e., $\left(\text{i.e., } \tilde{I}_{qh}^{\hat{e}} = 0\right),$ then the q-axis voltage from EQ. [3] reduces to the following:

$$\tilde{V}_{qh}^{\hat{e}} = \tilde{I}_{dh}^{\hat{e}}\left(-Z_{diff}\sin 2\hat{\theta}_{err}\right) \quad [4]$$

Thus, an injection of current on the d-axis may produce a q-axis voltage response as a function of the estimated rotor angular position error $\hat{\theta}_{err}$.

In the embodiment illustrated in FIG. 2, an exemplary implementation of deriving the estimated rotor angular position $\hat{\theta}$ within the motor controller 105 is shown at angular position estimation module 254. During an AC resistance heating mode of operation or otherwise during any period of rotor stasis, the torque command signal (Tcmd) 136 may be established at a null value which results in the command generation module 240 generate synchronous reference frame d-axis and q-axis current commands (I*d and I*q, respectively) 242 of zero. An AC signal 250 is, as previously described herein, injected to the current regulator module 270 on the d-axis current command I*d. A demodulator module 255 receives the synchronous reference frame q-axis voltage command V*q from the current regulator module 270. A non-zero value of q-axis voltage command V*q is indicative of a deviation of the rotor axis from the d-axis. The q-axis voltage command V*q corresponds to the q-axis voltage $$\hat{V}_{qh}^{\hat{e}}$$

from EQ. [3]. The demodulator module 255 also receives input from the frequency module 251 and amplitude module 253. The non-zero q-axis voltage command V*q has a frequency consistent with the injected AC signal 250. The demodulator module 255 removes the frequency component based on the input from the frequency module 251 and may apply filtering to remove remaining oscillatory components leaving a DC component 256 only. The DC component 256 may be divided by the input from the amplitude module 253 and divided by the difference between the stator impedance on the d-axis and then by the stator impedance on the q-axis (i.e., $Z_{diff}$ from EQ. [3], 2/(K)). An inverse Sine operator followed by a divide by two operator are applied to yield the estimated rotor angular position error $\hat{\theta}_{err}$. The estimated rotor angular position error $\hat{\theta}_{err}$ may then be subjected to a PI controller to yield an estimated rotor angular velocity $\hat{\omega}$. The estimated rotor angular velocity $\hat{\omega}$ may be subjected to an integration operator to yield an estimated rotor angular position $\hat{\theta}$. The estimated rotor angular position $\hat{\theta}$ is used in place of the rotor angular position (θ) 221 measured using the position sensor 182 in the FOC 200.

Apart from the utility that estimated rotor angular position $\hat{\theta}$ provides for recalibration of the position sensor 182, its determination may provide a robust closed-loop manner of rotor position determination useful, for example, to ensure alignment of the d-axis and rotor axis. Such alignment may be by way of converging the d-axis to the static rotor position or moving the rotor to a preferred d-axis position relative to the stator.

Figure 3:
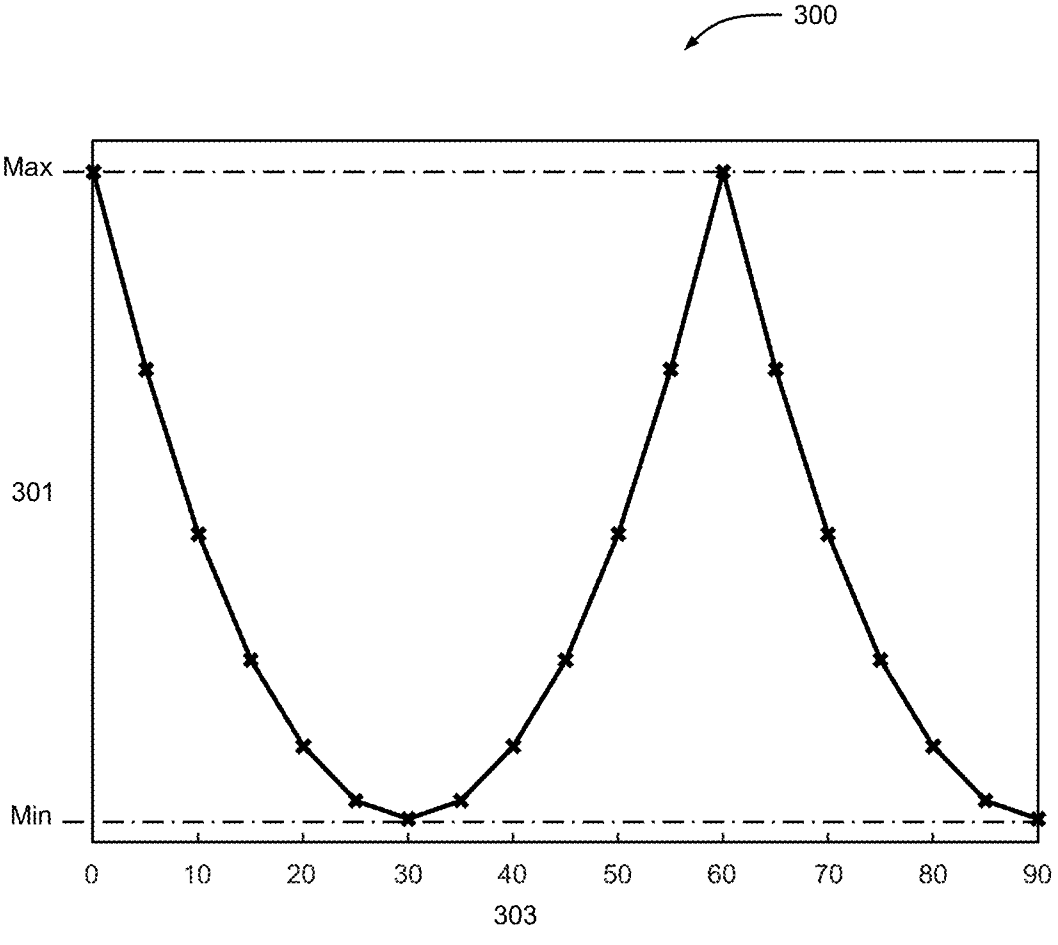
FIG. 3 illustrates a chart of relative heating efficiency versus rotor position for AC resistive heating, in accordance with the present disclosure.

FIG. 3 illustrates an exemplary chart 300 of relative heating efficiency along the vertical axis 301 versus rotor position 303 in degrees with higher efficiency toward the top of the chart. It is appreciated that the points of minimum heating efficiency (Min) correspond to the highest energy losses outside of the resistance losses within the battery pack (e.g., high $I^2R$ losses through the stator phase windings, high inverter losses), and the points of maximum efficiency (Max) correspond to the lowest energy losses outside of the resistance losses within the battery pack (e.g., low $I^2R$ losses through the stator phase windings, low inverter losses). Thus, in the exemplary three-phase motor with 120 degrees between each phase, the points of maximum efficiency (Max) are separated one from the next by 60 degrees. And, the points of minimum efficiency (Min) are separated one from the next by 60 degrees. The points of maximum efficiency (Max) are separated from the points of minimum efficiency (Min) by 30 degrees. Thus, a static rotor is never more than 30 degrees from an alignment with an angle of maximum efficiency (Max). While the present AC resistive heating control may converge the d-axis angle to the static rotor angle, it is most efficient and advantageous when the static rotor angle and thus the d-axis angle are aligned with an angle of maximum efficiency (Max). In an embodiment, the rotor angle (i.e., rotor angular position) may be known from one or both the position sensor 182 or the estimated rotor angular position and controlled to or as close as practical to an angle of maximum efficiency (Max) during an AC resistive heating cycle. In a drivetrain having a true mechanical neutral decoupling the motor from the wheels, the rotor may be freely repositioned to an angle of maximum efficiency (Max). However, in other drivetrains, rotor repositioning may be more limited, for example within the constraints of total geartrain lash which may be taken up as the rotor is repositioned. In the present exemplary embodiment, if the total geartrain lash can accommodate 30 degrees of rotor angular repositioning, then an angle of maximum efficiency (Max) may be attainable without torque transfer to the wheels. However, if the total geartrain lash cannot accommodate a full 30 degrees of rotor angular repositioning, then an angle of maximum efficiency (Max) may only be attainable if the initial rotor position is within the total geartrain lash that be accommodated before torque transfer to the wheels. In an embodiment, some amount of vehicle displacement may be acceptable and thus a total rotor repositioning of a full 30 degrees may be accommodated within the total available geartrain lash and acceptable vehicle displacement.

In an embodiment, estimated rotor angular position may be determined with application of rotor torque that is insufficient to displace the vehicle or even insufficient to displace the rotor even within the geartrain lash tolerances discussed herein thereby avoiding potentially objectionable torque disturbances in the driveline. Thus, convergence of the estimated rotor position to the static rotor position may be accomplished without displacement of the rotor, geartrain components or the vehicle. Once such low torque convergence is accomplished, the alignment of the d-axis with the rotor axis then allows for the application of substantial d-axis currents for AC resistive heating which will produce zero torque on the aligned rotor. Also as mentioned herein, the rotor may be controlled to a preferred d-axis position relative to the stator and thus the d-axis angle and rotor are aligned with a preferred angle, for example an angle of maximum efficiency (Max) or as close to such angle as practical in accordance with the constraints discussed herein. Controlling the rotor in such a fashion may also be accomplished at relatively low torque sufficient to reposition the rotor yet insufficient to displace the vehicle for example. Ultimately, the alignment of the d-axis with the rotor axis then allows for the application of substantial d-axis currents for AC resistive heating which will produce zero torque on the aligned rotor. Low torque convergence as described herein is a matter of low amplitude control of the AC signal being injected to the current regulator module 270 on the d-axis current command I*d (or on the d-axis voltage command V*d). In some embodiments, low torque convergence and corresponding low amplitude AC signals may correspond to a predetermined displacement limit on the vehicle, or any part of the drivetrain including wheels, axles, gear sets, gears or the rotor itself including limits down to and including zero.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for heating a battery pack in an electrified vehicle, comprising:

providing a zero d-axis current command and a zero q-axis current command to a field-oriented controller for an alternating current (AC) motor coupled to the battery pack through a power inverter module controlled by the field-oriented controller; and injecting an AC signal onto the d-axis of the field-oriented controller.

2. The method of claim 1, wherein injecting the AC signal onto the d-axis of the field-oriented controller comprises injecting the AC signal onto the zero d-axis current command.

3. The method of claim 2, further comprising deriving an estimated rotor angular position error from a q-axis voltage command from the field-oriented controller based upon the following relationship:

$$\tilde{V}_{qh}^{\hat{e}} = \tilde{I}_{dh}^{\hat{e}}\left(-Z_{diff}\sin 2\hat{\theta}_{err}\right)$$

where $\hat{\theta}_{err}$ is the estimated rotor angular position error, $Z_{diff}$ is the difference between a stator impedance on the d-axis and a stator impedance on the q-axis, $$\tilde{V}_{qh}^{\hat{e}}$$

a q-axis voltage command, and $$\tilde{I}_{dh}^{\hat{e}}$$

is a d-axis current command subsequent to the AC signal injection.

4. The method of claim 1, wherein injecting the AC signal onto the d-axis of the field-oriented controller comprises injecting the AC signal onto a d-axis voltage command.

5. The method of claim 1, further comprising deriving an estimated rotor angular position from a q-axis voltage command from the field-oriented controller that is demodulated based upon the AC signal.

6. The method of claim 5, wherein the AC signal comprises an amplitude of low torque convergence of the estimated rotor angular position to a static rotor position.

7. The method of claim 1, further comprising controlling a rotor toward a predetermined angular position of maximum battery pack heating efficiency.

8. The method of claim 1, wherein the field-oriented controller comprises a resonant controller module.

9. The method of claim 1, wherein injecting the AC signal onto the d-axis of the field-oriented controller comprises controlling an amplitude, a shape and a frequency of the AC signal.

10. An apparatus for heating a battery pack in an electrified vehicle, comprising:

an alternating current (AC) motor coupled to the battery pack through a power inverter module; and a field-oriented controller controlling the AC motor based upon a zero d-axis current command and a zero q-axis current command and an AC signal injected onto the d-axis of the field-oriented controller.

11. The apparatus of claim 10, wherein the AC signal injected onto the d-axis of the field-oriented controller comprises the AC signal injected onto the zero d-axis current command.

12. The apparatus of claim 11, further comprising an angular position estimation module deriving an estimated rotor angular position error from a q-axis voltage command from the field-oriented controller based upon the following relationship:

$$\tilde{V}_{qh}^{\hat{e}} = \tilde{I}_{dh}^{\hat{e}}\left(-Z_{diff}\sin 2\hat{\theta}_{err}\right)$$

where $\hat{\theta}_{err}$ is the estimated rotor angular position error, $Z_{diff}$ is the difference between a stator impedance on the d-axis and a stator impedance on the q-axis, $$\tilde{V}_{qh}^{\hat{e}}$$

is a q-axis voltage command, and $$\tilde{I}_{dh}^{\hat{e}}$$

is a d-axis current command subsequent to the AC signal injection.

13. The apparatus of claim 10, wherein the AC signal injected onto the d-axis of the field-oriented controller comprises the AC signal injected onto a d-axis voltage command.

14. The apparatus of claim 10, further comprising an angular position estimation module deriving an estimated rotor angular position from a q-axis voltage command from the field-oriented controller that is demodulated based upon the AC signal.

15. The apparatus of claim 14, wherein the AC signal comprises an amplitude of low torque convergence of the estimated rotor angular position to a static rotor position.

16. The apparatus of claim 10, wherein the field-oriented controller controls a rotor toward a predetermined angular position of maximum battery pack heating efficiency.

17. The apparatus of claim 10, wherein the field-oriented controller comprises a resonant controller module.

18. The apparatus of claim 10, wherein the AC signal injected onto the d-axis of the field-oriented controller comprises an amplitude, a shape and a frequency of the AC signal.

19. An electrified vehicle, comprising:

a rechargeable energy storage system including a battery pack;

an electric drive unit including a three-phase alternating current motor having a stator including three phase windings and a rotor, a traction power inverter module coupling the battery pack via a direct current (DC) link to the three-phase alternating current motor, a motor controller, and a gearbox mechanically coupling a rotor shaft of the rotor to at least one mechanical output;

at least one wheel mechanically coupled to the at least one mechanical output of the gearbox; and the motor controller including a field-oriented controller controlling the three-phase alternating current motor based upon a zero d-axis current command and a zero q-axis current command, the motor controller further including an alternating current signal injected onto the zero d-axis current command effective to produce an perturbation on the DC link effecting an alternating current through the battery pack.

20. The electrified vehicle of claim 19, wherein the field-oriented controller comprises an angular position estimation module deriving an estimated rotor angular position from a q-axis voltage command from the field-oriented controller that is demodulated based upon the alternating current signal, and a resonant controller module.

* * * * *